(12) United States Patent
Ko

(10) Patent No.: US 10,127,726 B2
(45) Date of Patent: Nov. 13, 2018

(54) ELECTRONIC APPARATUS, CONTROL METHOD THEREOF, COMPUTER PROGRAM, AND COMPUTER-READABLE RECORDING MEDIUM

(71) Applicant: THINKWARE CORPORATION, Seongnam-si, Gyeonggi-do (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 14/955,725

(22) Filed: Dec. 1, 2015

(65) Prior Publication Data
US 2016/0155268 A1    Jun. 2, 2016

(30) Foreign Application Priority Data

Dec. 1, 2014   (KR) .................. 10-2014-0170048
Mar. 16, 2015  (KR) .................. 10-2015-0036147

(51) Int. Cl.
| | |
|---|---|
| G09G 5/00 | (2006.01) |
| G06T 19/00 | (2011.01) |
| G06T 7/20 | (2017.01) |
| B60R 1/00 | (2006.01) |
| G06T 17/05 | (2011.01) |

(52) U.S. Cl.
CPC .............. *G06T 19/006* (2013.01); *B60R 1/00* (2013.01); *G06T 7/20* (2013.01); *G06T 17/05* (2013.01); *B60R 2300/207* (2013.01); *B60R 2300/30* (2013.01); *B60R 2300/302* (2013.01); *B60R 2300/307* (2013.01); *B60R 2300/80* (2013.01)

(58) Field of Classification Search
None
See application file for complete search history.

(56) References Cited

U.S. PATENT DOCUMENTS

| | | | | |
|---|---|---|---|---|
| 2012/0197504 A1* | 8/2012 | Sujan | .................. | G01C 21/3469 |
| | | | | 701/70 |
| 2012/0223844 A1* | 9/2012 | Giuli | ..................... | G08G 1/205 |
| | | | | 340/993 |
| 2013/0090955 A1* | 4/2013 | Gore | ..................... | G06Q 40/08 |
| | | | | 705/4 |
| 2013/0124082 A1* | 5/2013 | Cho | ................... | G01C 21/3638 |
| | | | | 701/409 |
| 2013/0293582 A1* | 11/2013 | Ng-Thow-Hing | .... | G06T 19/006 |
| | | | | 345/633 |

(Continued)

FOREIGN PATENT DOCUMENTS

| | | |
|---|---|---|
| CN | 101464153 A | 6/2009 |
| CN | 102016930 A | 4/2011 |

(Continued)

*Primary Examiner* — Frank Chen
(74) *Attorney, Agent, or Firm* — Sang Ho Lee; Novick, Kim & Lee, PLLC

(57) ABSTRACT

Disclosed herein is a control method of an electronic apparatus. The control method of an electronic apparatus includes: calculating an average speed of a vehicle when a specific event occurs; generating an object indicating a relationship between the calculated average speed and an event speed corresponding to the specific event; and outputting the generated object through augmented reality.

20 Claims, 18 Drawing Sheets

(56) References Cited

U.S. PATENT DOCUMENTS

| | | | | |
|---|---|---|---|---|
| 2014/0152603 A1* | 6/2014 | Algreatly | ............ | G06F 3/04815 |
| | | | | 345/173 |
| 2014/0368540 A1* | 12/2014 | Iguchi | ................ | G06K 9/00832 |
| | | | | 345/633 |
| 2016/0082971 A1* | 3/2016 | Fuehrer | ................ | B60W 10/20 |
| | | | | 701/48 |
| 2017/0011562 A1* | 1/2017 | Hodges | ................ | G07C 5/008 |

FOREIGN PATENT DOCUMENTS

| | | |
|---|---|---|
| CN | 102027509 A | 4/2011 |
| CN | 102027510 A | 4/2011 |
| CN | 103105171 A | 5/2013 |

\* cited by examiner

ELECTRONIC APPARATUS, CONTROL METHOD THEREOF, COMPUTER PROGRAM, AND COMPUTER-READABLE RECORDING MEDIUM

CROSS-REFERENCE TO RELATED APPLICATION

This application claims the priority and benefit of Korean Patent Application Nos. 10-2014-0170048, filed on Dec. 1, 2014, and 10-2015-0036147, filed on Mar. 16, 2015, with the Korean Intellectual Property Office, the disclosures of which are incorporated herein by reference.

BACKGROUND OF THE INVENTION

1. Field of the Invention

The present invention relates to an electronic apparatus, a control method thereof, a computer program, and a computer-readable recording medium, and more particularly, to an electronic apparatus capable of performing driving related guidance on a user on augmented reality, a control method thereof, a computer program, and a computer-readable recording medium.

2. Description of the Related Art

It is most important to safely drive a vehicle and prevent a traffic accident at the time of driving the vehicle. To this end, various assist apparatuses performing an attitude control of the vehicle, a function control of components of the vehicle, and the like, and safety apparatuses such as a safety belt, an air bag, and the like, have been mounted in the vehicle.

In addition, recently, apparatuses such as a black box, and the like, positioned in the vehicle and storing a driving image of the vehicle and data transmitted from various sensors therein to find out a cause of an accident of the vehicle at the time of occurrence of the accident have been provided in the vehicle. Portable terminals such as a smart phone and a tablet personal computer (PC) in which a black box application, a navigation application, or the like, may be mounted have been used as the apparatuses for a vehicle as described above.

However, currently, utilization of the driving image is low in the apparatuses for a vehicle as described above. In more detail, currently, even though the driving image of the vehicle is obtained through a vision sensor such as a camera mounted in the vehicle, an electronic apparatus of the vehicle has simply displayed or transmitted the driving image or has generated only simple surrounding notification information such as whether or not the vehicle has departed from a lane, or the like.

In addition, a head-up display (HUD) or an augmented reality interface has also been suggested as an electronic apparatus of the vehicle that has newly emerged currently. However, in the HUD and the augmented reality interface, the driving image of the vehicle has been utilized to be simply displayed or generate the simple surrounding notification information.

SUMMARY

An object of the present invention is to provide an electronic apparatus capable of generating an object indicating a relationship between an average speed of a vehicle and an event speed corresponding to a specific event and outputting the generated object through augmented reality, a control method thereof, a computer program, and a computer-readable recording medium.

According to an exemplary embodiment of the present invention, there is provided a control method of an electronic apparatus, including: calculating an average speed of a vehicle when a specific event occurs; generating an object indicating a relationship between the calculated average speed and an event speed corresponding to the specific event; and outputting the generated object through augmented reality.

The specific event may include at least one of a section speed regulation section entry event, a route guidance start event up to a destination, and a traffic information providing section entry event.

In the case of the section speed regulation section entry event, the generating may include: comparing an average speed of the vehicle calculated on the basis of a section speed regulation section entry point in time and a limit average speed of a section speed regulation section with each other; and generating an object indicating a relationship between the average speed of the vehicle and the limit average speed depending on a comparison result.

In the case of the route guidance start event up to the destination, the generating may include: calculating a route average speed on the basis of an arrival estimated time calculated by reflecting real time traffic information of a route guidance start point in time; comparing the average speed of the vehicle and the route average speed; and generating an object indicating a relationship between the average speed of the vehicle and the route average speed depending on a comparison result.

In the case of the traffic information providing section entry event, the generating may include: comparing an average speed of the vehicle calculated on the basis of a traffic information providing section entry point in time and a section average speed of the traffic information providing section with each other; and generating an object indicating a relationship between the average speed of the vehicle and the section average speed depending on a comparison result.

The generating may include: generating a first object in the case in which the average speed of the vehicle is slower than the event speed; and generating a second object in the case in which the average speed of the vehicle is faster than the event speed.

The outputting may include: performing calibration on a camera to calculate camera parameters; generating a virtual 3D space for a photographed image of the camera on the basis of the camera parameters; and positioning the generated object on the virtual 3D space.

In the positioning, the first and second objects may be controlled to be positioned and expressed at a lower end of a vanishing point of the photographed image of the camera.

A distance between the first object and the vanishing point may be shorter than a distance between the second object and the vanishing point.

The first and second objects may be distinguished from each other by different colors.

Expression positions of the first and second objects may be fluidly changed depending on a difference between the average speed of the vehicle and the event speed.

According to another exemplary embodiment of the present invention, there is provided an electronic apparatus including: a display unit displaying a screen; an average speed calculating unit calculating an average speed of a vehicle when a specific event occurs; an object generating unit generating an object indicating a relationship between the calculated average speed and an event speed corresponding to the specific event; and a control unit controlling the display unit to output the generated object through augmented reality.

The specific event may include at least one of a section speed regulation section entry event, a route guidance start event up to a destination, and a traffic information providing section entry event.

In the case of the section speed regulation section entry event, the control unit may compare an average speed of the vehicle calculated on the basis of a section speed regulation section entry point in time and a limit average speed of a section speed regulation section with each other, and the object generating unit may generate an object indicating a relationship between the average speed of the vehicle and the limit average speed depending on a comparison result.

In the case of the route guidance start event up to the destination, the control unit may calculate a route average speed on the basis of an arrival estimated time calculated by reflecting real time traffic information of a route guidance start point in time and compare the average speed of the vehicle and the route average speed, and the object generating unit may generate an object indicating a relationship between the average speed of the vehicle and the route average speed depending on a comparison result.

In the case of the traffic information providing section entry event, the control unit may compare an average speed of the vehicle calculated on the basis of a traffic information providing section entry point in time and a section average speed of the traffic information providing section with each other, and the object generating unit may generate an object indicating a relationship between the average speed of the vehicle and the section average speed depending on a comparison result.

The object generating unit may generate a first object in the case in which the average speed of the vehicle is slower than the event speed and generate a second object in the case in which the average speed of the vehicle is faster than the event speed.

The control unit may perform calibration on a camera to calculate camera parameters, generate a virtual 3D space for a photographed image of the camera on the basis of the camera parameters, and position the generated object on the virtual 3D space.

The control unit may perform a control so that the first and second objects are positioned and expressed at a lower end of a vanishing point of the photographed image of the camera.

A distance between the first object and the vanishing point may be shorter than a distance between the second object and the vanishing point.

The first and second objects may be distinguished from each other by different colors.

Expression positions of the first and second objects may be fluidly changed depending on a difference between the average speed of the vehicle and the event speed.

According to still another exemplary embodiment of the present invention, there is provided a computer program stored in a recording medium coupled to an electronic apparatus to execute the following steps: calculating an average speed of a vehicle when a specific event occurs; generating an object indicating a relationship between the calculated average speed and an event speed corresponding to the specific event; and outputting the generated object through augmented reality.

According to yet still another exemplary embodiment of the present invention, there is provided a computer-readable recording medium in which a computer program for executing a control method of an electronic apparatus is stored, wherein the control method of an electronic apparatus includes: calculating an average speed of a vehicle when a specific event occurs; generating an object indicating a relationship between the calculated average speed and an event speed corresponding to the specific event; and outputting the generated object through augmented reality.

DETAILED DESCRIPTION

Figure 1:
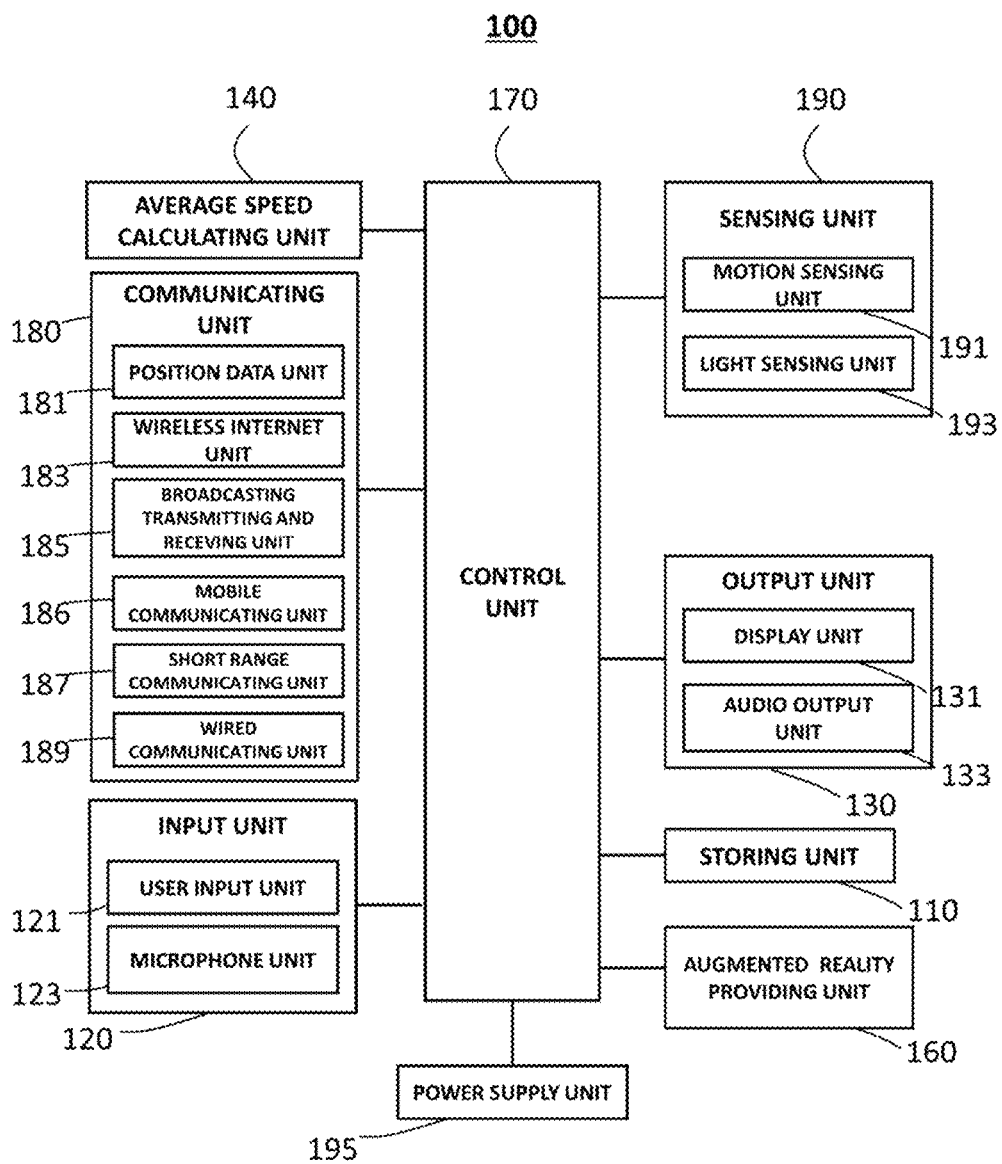
FIG. 1 is a block diagram illustrating an electronic apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various devices including processors or functional blocks represented as concepts similar to the processors and shown in the accompanying drawings may be provided by using hardware having capability to execute appropriate software as well as dedicated hardware. When the functions are provided by the processors, they may be provided by a single dedicated processor, a single shared processor, or a plurality of individual processors, and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating an electronic apparatus according to an exemplary embodiment of the present invention. Referring to FIG. 1, the electronic apparatus 100 is configured to include all or some of a storing unit 110, an input unit 120, an output unit 130, an average speed calculating unit 140, an augmented reality providing unit 160, a control unit 170, a communicating unit 180, a sensing unit 190, and a power supply unit 195.

Here, the electronic apparatus 100 may be implemented by various apparatuses such as a smart phone, a tablet computer, a laptop computer, a personal digital assistant (PDA), a portable multimedia player (PMP), a smart glasses, a project glasses, a navigation apparatus, a black box for a vehicle, and the like, that may provide driving related guidance to a driver of a vehicle that is in a operated state, and may be provided in the vehicle.

Here, the operated state of the vehicle may include various states in which the vehicle is being driven by the driver, such as a stopped state of the vehicle, a driven state of the vehicle, a parked state of the vehicle, and the like.

The driving related guidance may include various kinds of guidance for assisting in driving of the driver of the vehicle, such as route guidance, lane departure guidance, front vehicle start guidance, signal lamp change guidance, front vehicle collision preventing guidance, lane change guidance, lane guidance, and the like.

Here, the route guidance may include augmented reality route guidance performing route guidance by combining various information such as a position, a direction, and the like, of a user with an image obtained by photographing the front of the vehicle that is being operated and two-dimensional (2D) or three-dimensional (3D) route guidance performing route guidance by combining various information such as a position, a direction, and the like, of a user with a 2D or 3D map data. Here, the route guidance may be interpreted as a concept including route guidance in the case in which the user walks or runs and moves as well as in the case in which the user gets in the vehicle and then drives the vehicle.

In addition, the lane departure guidance may be to guide whether or not the vehicle that is being driven has departed from a lane.

In addition, the front vehicle start guidance may be to guide whether or not a vehicle positioned in front of a vehicle that is being stopped has started.

In addition, the signal lamp change guidance may be to guide whether or not a signal lamp positioned in front of a vehicle that is being stopped has been changed. As an example, the signal lamp change guidance may be to guide that a state of the signal lamp is changed from a red lamp indicating a stop signal into a green lamp indicating a start signal.

In addition, the front vehicle collision preventing guidance may be to guide that a distance between a vehicle that is being stopped or driven and a vehicle positioned in front of the vehicle is within a predetermined distance in order to prevent collision between the above-mentioned vehicles when the distance between the vehicle that is being stopped or driven and the vehicle positioned in front of the vehicle is within the predetermined distance.

In addition, the lane change guidance may be to guide a change from a lane in which a vehicle is positioned into another lane in order to guide a route up to a destination.

In addition, the lane guidance may be to guide a lane in which a vehicle is currently positioned.

A driving related image such as a front image of the vehicle enabling provision of various kinds of guidance may be photographed by a camera mounted in the vehicle. Here, the camera may be a camera formed integrally with the electronic apparatus 100 mounted in the vehicle and photographing the front of the vehicle. In this case, the camera may be formed integrally with a smart phone, a navigation apparatus, or a black box for a vehicle, and the electronic apparatus 100 may receive the image photographed by the camera formed integrally therewith.

As another example, the camera may be a camera mounted in the vehicle separately from the electronic apparatus 100 and photographing the front of the vehicle. In this case, the camera may be a black box separately mounted toward the front of the vehicle, and the electronic apparatus 100 may receive a photographed image through wired/wireless communication with the separately mounted black box or receive the photographed image when a storage medium storing the photographed image of the black box therein is inserted into the electronic apparatus 100.

Hereinafter, the electronic apparatus 100 according to an exemplary embodiment of the present invention will be described in more detail on the basis of the above-mentioned content.

The storing unit 110 serves to store various data and applications required for an operation of the electronic apparatus 100 therein. Particularly, the storing unit 110 may store data required for the operation of the electronic apparatus 100, for example, an operating system (OS), a route search application, a map data, and the like, therein. In addition, the storing unit 110 may store data generated by the operation of the electronic apparatus 100, for example, a searched route data, a received image, and the like, therein.

Here, the storing unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive a speech of the user and a sound generated in the inside and the outside of the vehicle.

The output unit 130 is a unit outputting data of the electronic apparatus 100. Here, the output unit 130 may include all or some of a display unit 131 and an audio output unit 133.

The display unit 131 is a unit outputting data that may be visually recognized in the electronic apparatus 100. The display unit 131 may be implemented by a display unit provided on a front surface of a housing of the electronic apparatus 100. In addition, the display unit 131 may be formed integrally with the electronic apparatus 100 and output visual recognition data, or may be installed separately from the electronic apparatus 100 like a head-up display (HUD) and output visual recognition data.

The audio output unit 133 is a unit outputting data that may be auditorily recognized in the electronic apparatus 100. The audio output unit 133 may be implemented by a speaker representing a data that is to be reported to the user of the electronic apparatus 100 as a sound.

The communicating unit 180 may be provided in order for the electronic apparatus 100 to communicate with other devices. The communicating unit 180 may include all or some of a position data unit 181, a wireless Internet unit 183, a broadcasting transmitting and receiving unit 185, a mobile communicating unit 186, a short range communicating unit 187, and a wired communicating unit 189.

The position data unit 181 is a device obtaining position data through a global navigation satellite system (GNSS). The GNSS means a navigation system that may calculate a position of a receiving terminal using a radio signal received from an artificial satellite. A detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The position data unit 181 of the electronic apparatus 100 according to an exemplary embodiment of the present invention may obtain position data by receiving GNSS signals served in a zone in which the electronic apparatus 100 is used.

The wireless Internet unit 183 is a device accessing the wireless Internet to obtain or transmit data. The wireless Internet that may be accessed through the wireless Internet unit 183 may be a wireless local area network (WLAN), a wireless broadband (Wibro), a world interoperability for microwave access (Wimax), a high speed downlink packet access (HSDPA), or the like.

The broadcasting transmitting and receiving unit 185 is a device transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include a traffic data, a living data, and the like.

The mobile communicating unit 186 may access a mobile communication network to perform communication depending on various mobile communication protocols such as 3rd generation (3G), 3rd generation partnership project (3GPP), long term evolution (LTE), and the like.

The short range communicating unit 187 is a device for short range communication. The short range communicating unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communicating unit 189 is an interface device that may connect the electronic apparatus 100 to another device in a wired scheme. The wired communicating unit 189 may be a USB module that may perform communication through a USB port.

The communicating unit 180 may communicate with another device using at least one of the position data unit 181, the wireless Internet unit 183, the broadcasting transmitting and receiving unit 185, the mobile communicating unit 186, the short range communicating unit 187, and the wired communicating unit 189.

As an example, in the case in which the electronic apparatus 100 does not include a camera function, an image photographed by a camera for a vehicle such as a black box, or the like, may be received using at least one of the short range communicating unit 187 and the wired communicating unit 189.

As another example, in the case in which the electronic apparatus communicates with a plurality of devices, the electronic apparatus may communicate with any one of the plurality of devices through the short range communicating unit 187, and communicate with another device of the plurality of devices through the wired communicating unit 189.

The sensing unit 190 is a unit that may sense a current state of the electronic apparatus 100. The sensing unit 190 may include all or some of a motion sensing unit 191 and a light sensing unit 193.

The motion sensing unit 191 may sense motion of the electronic apparatus 100 on a 3D space. The motion sensing unit 191 may include a tri-axial terrestrial magnetism sensor and a tri-axial acceleration sensor. Motion data obtained through the motion sensing unit 191 may be combined with the position data obtained through the position data unit 181 to more accurately calculate a trajectory of the vehicle to which the electronic apparatus 100 is attached.

The light sensing unit 193 is a device measuring surrounding illuminance of the electronic apparatus 100. Brightness of the display unit 131 may be changed so as to correspond to surrounding brightness using illuminance data obtained through the light sensing unit 193.

The power supply unit 195 is a device supplying power required for an operation of the electronic apparatus 100 or an operation of another device connected to the electronic apparatus 100. The power supply unit 195 may be a device receiving power from an external power supply such as a battery embedded in the electronic apparatus 100, the vehicle, or the like. Alternatively, the power supply unit 195 may be implemented by the wired communicating unit 189 or a device receiving power in a wireless scheme depending on a scheme in which it receives the power.

The average speed calculating unit 140 may calculate an average speed of the vehicle including the electronic apparatus 100. In detail, the average speed calculating unit 140 may calculate the average speed of the vehicle on the basis of the motion data obtained in the sensing unit 190 and the position data obtained in the position data unit 181. Alternatively, the average speed calculating unit 140 may receive real time speed information of the vehicle using controller area network (CAN) communication of the vehicle, and calculate the average speed of the vehicle on the basis of the real time speed information.

Meanwhile, the electronic apparatus 100 according to an exemplary embodiment of the present invention may include the augmented reality providing unit 160 providing an augmented reality view mode. The augmented reality providing unit 160 will be described in detail with reference to FIG. 2.

Figure 2:
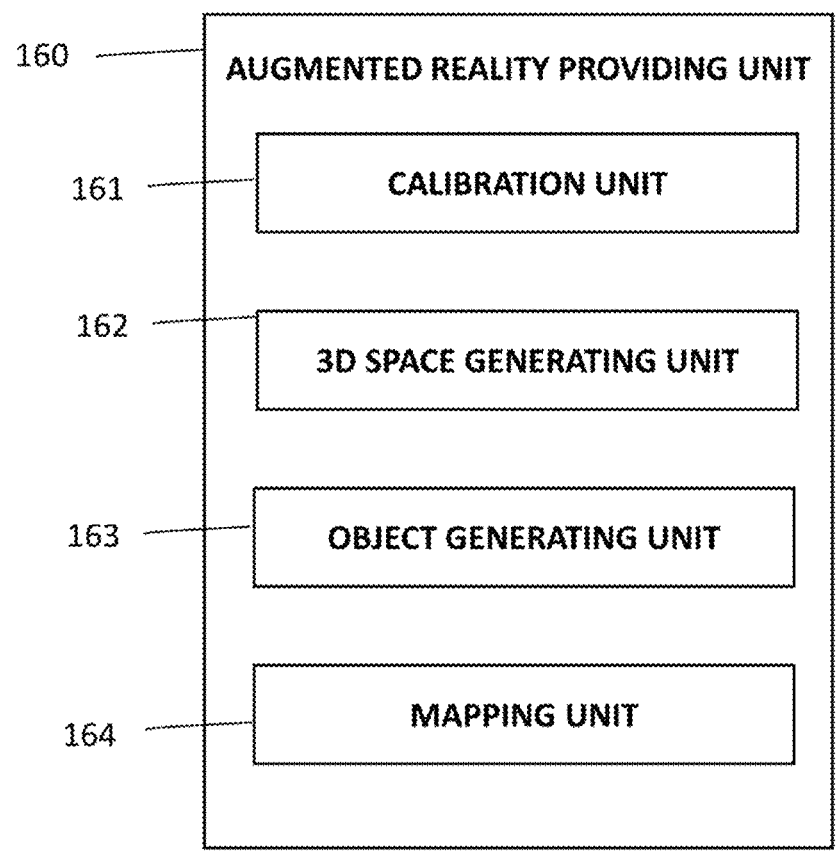
FIG. 2 is a block diagram illustrating an augmented reality providing unit according to an exemplary embodiment of the present invention in detail.

FIG. 2 is a block diagram illustrating an augmented reality providing unit 160 according to an exemplary embodiment of the present invention in detail. Referring to FIG. 2, the augmented reality providing unit 160 may include all or some of a calibration unit 161, a 3D space generating unit 162, an object generating unit 163, and a mapping unit 164.

The calibration unit 161 may perform calibration for estimating camera parameters corresponding to the camera from the photographed image photographed in the camera. Here, the camera parameters may be parameters configuring a camera matrix, which is information indicating a relationship between a real space and a photograph.

The 3D space generating unit 162 may generate a virtual 3D space on the basis of the photographed image photographed in the camera. In detail, the 3D space generating unit 162 may obtain depth information from an image photographed by the camera on the basis of the camera parameters estimated by the calibration unit 161, and generate the virtual 3D space on the basis of the obtained depth information and the photographed image.

The object generating unit 163 may generate objects for guidance, for example, a route guidance object, a lane change guidance object, a lane departure guidance object, and the like, on the augmented reality. Particularly, the object generating unit 163 may generate an object indicating a relationship (for example, a speed difference, or the like) between the average speed of the vehicle calculated in the average speed calculating unit 140 and an event speed corresponding to a specific event. Here, the object may be implemented by a 3D object, an image, an art line, or the like.

The mapping unit 164 may map the object generated in the object generating unit 163 to the virtual 3D space generated in the 3D space generating unit 162.

Meanwhile, the control unit 170 controls a general operation of the electronic apparatus 100. In detail, the control unit 170 may control all or some of the storing unit 110, the input unit 120, the output unit 130, the average speed calculating unit 140, the augmented reality providing unit 160, the communicating unit 180, and the sensing unit 190.

Particularly, the control unit 170 may determine whether or not the specific event has occurred. Here, the specific event may include at least one of a section speed regulation section entry event, a route guidance start event up to a destination, and a traffic information providing section entry event.

Section speed regulation, which is one of kinds of over-speed regulation of the vehicle, is a regulation scheme of determining whether or not the vehicle an over-speed has been generated in a section by calculating an average speed of the vehicle on the basis of a time in which and a speed at which the vehicle passes through a point A, which is a section speed regulation start point, and a movement distance up to a point B. Here, the section speed regulation section entry event may be an event in which the vehicle enters the section speed regulation start point.

In addition, the route guidance start event may be an event in which route guidance from a current position of the vehicle up to the destination is requested, such that the electronic apparatus 100 starts the route guidance.

In addition, a traffic information providing section may be a road section in which a text based additional traffic information service such as a road traffic message (RTM), congestion and travel time information (CTT), and the like, is provided through a transport protocol expert group (TPEG), or the like. Here, the traffic information providing section entry event may be an event in which the vehicle enters a road section in which the above-mentioned traffic information is provided among a plurality of road sections.

Meanwhile, when it is determine that the above-mentioned event has occurred, the control unit 170 may control the object generating unit 163 to generate the object indicating the relationship between the average speed calculated in the average speed calculating unit 140 and the event speed corresponding to the specific event. Here, the relationship between the average speed and the event speed may include, for example, a speed difference between the average speed and the event speed.

As an example, in the case in which the specific event is the section speed regulation section entry event, the control unit 170 may compare an average speed of the vehicle calculated on the basis of a section speed regulation section entry point in time and a limit average speed of the section speed regulation section with each other, and control the object generating unit 163 to generate an object indicating a relationship between the average speed of the vehicle and the limit average speed depending on a comparison result.

As another example, in the case in which the specific event is the route guidance start event up to the destination, the control unit 170 may calculate a route average speed on the basis of an arrival estimated time calculated by reflecting real time traffic information (for example, road traffic information through the TPEG, or the like) of a route guidance start point in time, compare the average speed of the vehicle and the route average speed, and control the object generating unit 163 to generate an object indicating a relationship between the average speed of the vehicle and the route average speed depending on a comparison result.

As still another example, in the case in which the specific event is the traffic information providing section entry event, the control unit 170 may compare an average speed of the vehicle calculated on the basis of a traffic information providing section entry point in time and a section average speed of the traffic information providing section with each other, and control the object generating unit 163 to generate an object indicating a relationship between the average speed of the vehicle and the section average speed depending on a comparison result.

Meanwhile, the control unit 170 may control the object generating unit 163 to generate a first object in the case in which the average speed of the vehicle is slower than the event speed, and may control the object generating unit 163 to generate a second object in the case in which the average speed of the vehicle is faster than the event speed.

In addition, the control unit 170 may control the mapping unit 164 so that the first and second objects are positioned and expressed at a lower end of a vanishing point of the photographed image of the camera. Here, the vanishing point may be detected using the photographed image. This will be described in detail with reference to FIG. 3.

Figure 3:
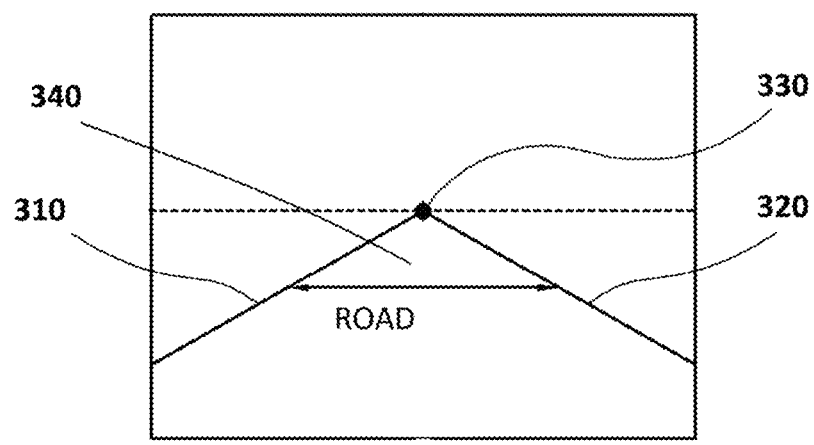
FIG. 3 is a view illustrating a vanishing point determining method according to an exemplary embodiment of the present invention.

Referring to FIG. 3, the control unit 170 may extract lane information 310 and lane information 320 from the photographed image, and extract an intersection point between the lane information 310 and the lane information 320 by extending the lane information 310 and the lane information 320. In this case, the control unit 170 may detect the intersection point between the lane information 310 and the lane information 320 extracted by extending the lane information 310 and the lane information 320 as a vanishing point 330.

Meanwhile, the control unit 170 may control the mapping unit 164 so that the first and second objects are positioned and expressed at the lower end of the vanishing point 330. Referring to FIG. 3, the control unit 170 may determine a lower end region 340 of the vanishing point 330, and control the mapping unit 164 to map the first and second objects to the lower end region 340. Here, the lower end region 340 may be desirably a road region.

According to an exemplary embodiment of the present invention described above, an object indicating a speed relationship may be expressed as if it is positioned on a road of an augmented reality screen. Therefore, guidance may be provided to the driver by a more intuitive method.

Meanwhile, a distance between the first object and the vanishing point may be shorter than a distance between the second object and the vanishing point. For example, in the case in which the average speed of the vehicle is slower than the limit average speed of the section speed regulation section, the control unit 170 may control the mapping unit 164 to position the generated first object in the lower end region in the vicinity of the vanishing point. In addition, in the case in which the average speed of the vehicle is faster than the limit average speed of the section speed regulation section, the control unit 170 may control the mapping unit 164 to position the generated second object in a lower end region of the first object. That is, the first object may be expressed far away from the vehicle on the augmented reality screen, and the second object may be expressed adjacently to the vehicle on the augmented reality screen. As an example, the second object may be expressed at the lowermost end of the augmented reality screen corresponding to the position of the vehicle on the augmented reality screen. Therefore, the driver confirms the first and second objects through the augmented reality screen, thereby making it possible to easily recognize a difference between the average speed of the vehicle and the limit average speed of the section speed regulation section.

Alternatively, the first and second objects may be distinguished from each other by different colors. For example, in the case in which the average speed of the vehicle is slower than the limit average speed of the section speed regulation section, the control unit 170 may control the object generating unit 163 to generate a first object having a green color, and in the case in which the average speed of the vehicle is faster than the limit average speed of the section speed regulation section, the control unit 170 may control the object generating unit 163 to generate a second object having a red color.

Alternatively, expression positions of the first and second objects may be fluidly changed depending on the difference between the average speed of the vehicle and the event speed. For example, when a difference between the average speed of the vehicle and the limit average speed of the section speed regulation section is changed in a state in which the average speed of the vehicle is slower than the limit average speed, the control unit 170 may control the mapping unit 164 to position the first object while fluidly changing a position of the first object depending on the difference between the average speed of the vehicle and the limit average speed. That is, when the difference between the average speed of the vehicle and the limit average speed of the section speed regulation section is gradually increased in the state in which the average speed of the vehicle is slower than the limit average speed, the first object may be expressed farther and farther away from the vehicle on the augmented reality screen, and when the difference between the average speed of the vehicle and the limit average speed of the section speed regulation section is gradually decreased in the state in which the average speed of the vehicle is slower than the limit average speed, the first object may be expressed closer and closer to the vehicle on the augmented reality screen.

Figure 4:
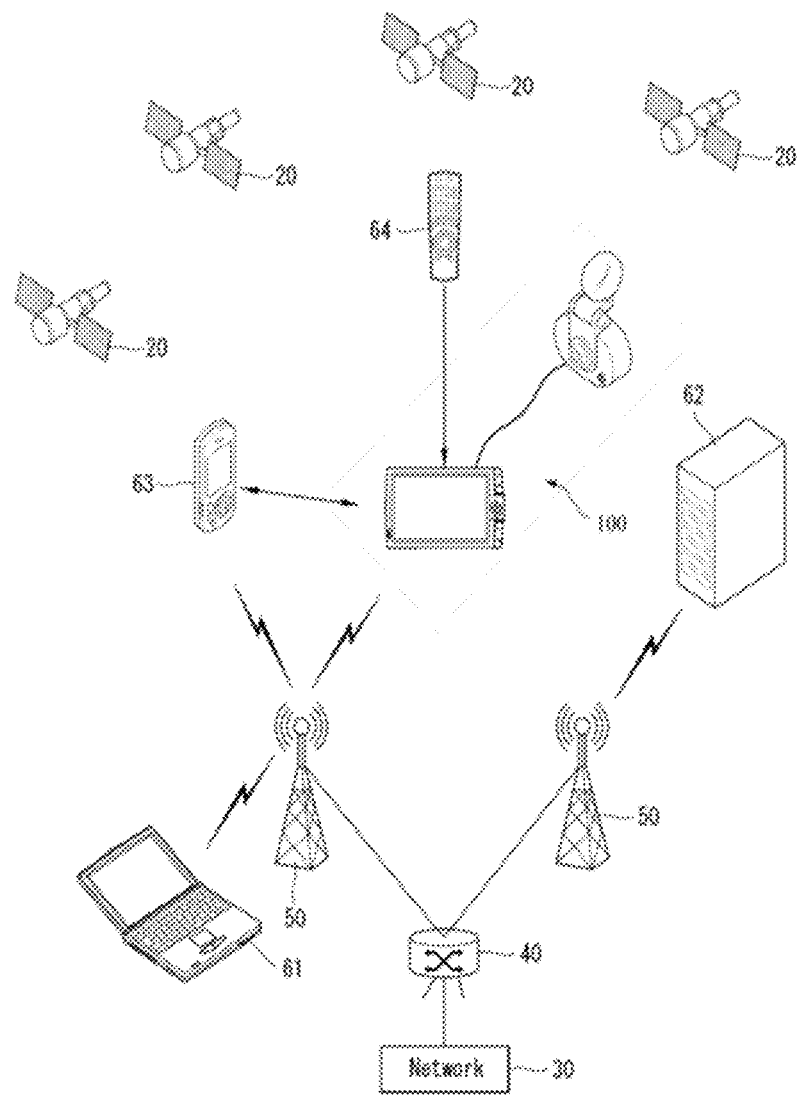
FIG. 4 is a view for describing a system network connected to an electronic apparatus according to an exemplary embodiment of the present invention.

FIG. 4 is a view for describing a system network connected to an electronic apparatus according to an exemplary embodiment of the present invention. Referring to FIG. 4, the electronic apparatus 100 according to an exemplary embodiment of the present invention may be implemented as various apparatuses provided in the vehicle, such as a navigation apparatus, a black box, a smart phone, other vehicle augmented reality interface providing apparatuses, or the like, and may be connected to various communication networks and other electronic devices 61 to 64.

In addition, the electronic apparatus 100 may interwork GPS modules with each other depending on radio signals received from artificial satellites 20 to calculate a current position and a current time.

The respective artificial satellites 20 may transmit L band frequencies of which frequency bands are different from each other. The electronic apparatus 100 may calculate the current position on the basis of a time required for the L band frequencies transmitted by the respective artificial satellites 20 to arrive at the electronic apparatus 100.

Meanwhile, the electronic apparatus 100 may wirelessly access a network 30 through an access control router (ACR) 40, a radio access station (RAS) 50, and the like, via the communicating unit 180. When the electronic apparatus 100 accesses the network 30, the electronic apparatus 100 may be indirectly connected to other electronic devices 61 and 62 accessing the network 30 to exchange data.

Meanwhile, the electronic apparatus 100 may also indirectly access the network 30 through another device 63 having a communication function. For example, in the case in which a module that may access the network 30 is not included in the electronic apparatus 100, the electronic apparatus 100 may communicate with another device 63 having the communication function through a short range communication module, or the like.

Figure 5:
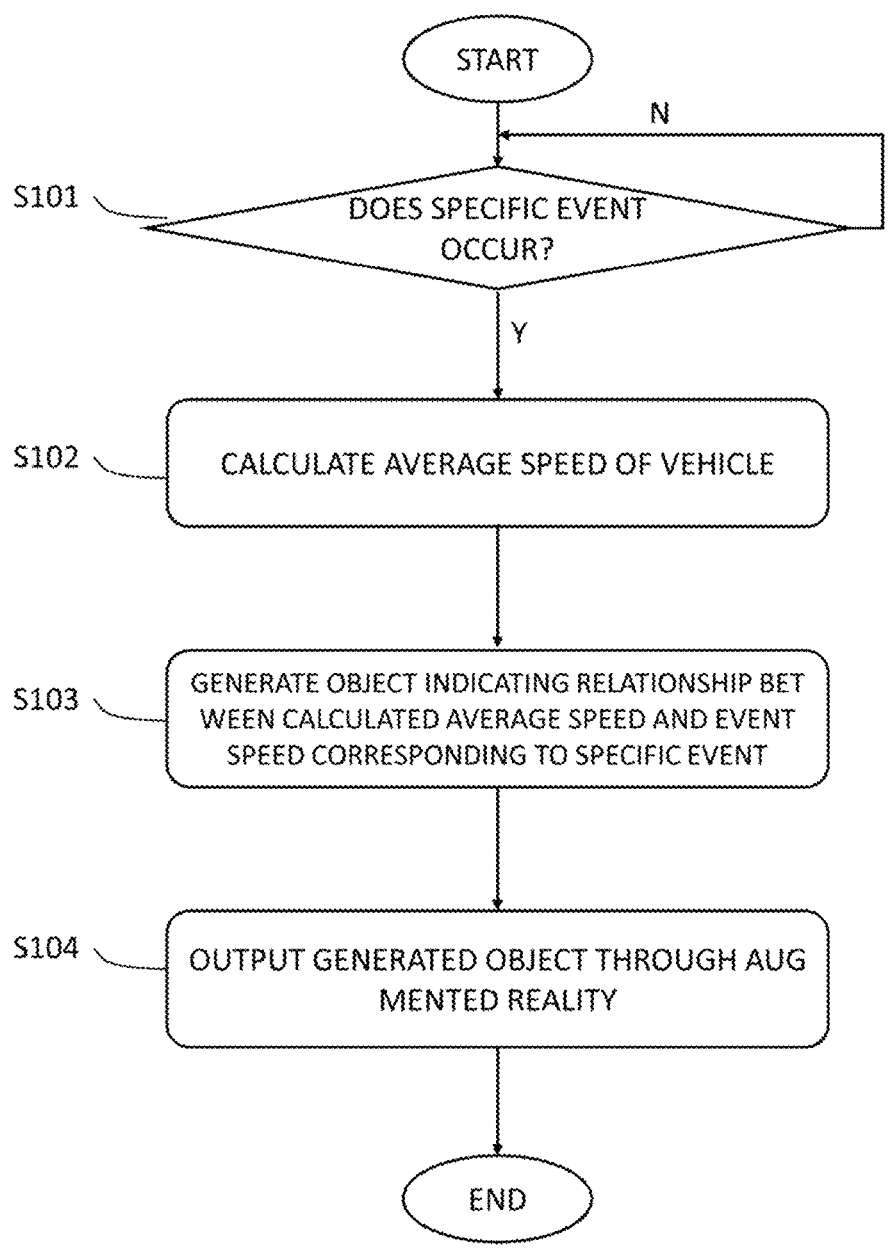
FIG. 5 is a flow chart schematically illustrating a control method of an electronic apparatus according to an exemplary embodiment of the present invention.

FIG. 5 is a flow chart schematically illustrating a control method of an electronic apparatus according to an exemplary embodiment of the present invention. Referring to FIG. 5, first, the electronic apparatus 100 may determine whether or not the specific event has occurred (S101). According to an exemplary embodiment of the present invention, the electronic apparatus 100 may determine that the specific event has occurred in the case in which at least one of the section speed regulation section entry event, the route guidance start event up to the destination, and the traffic information providing section entry event occurs.

Then, when the specific event occurs, the electronic apparatus 100 may calculate the average speed of the vehicle (S102).

Then, the electronic apparatus 100 may generate the object indicating the relationship between the calculated average speed and the event speed corresponding to the specific event (S103).

Then, the electronic apparatus 100 may output the generated object through the augmented reality (S104).

Hereinafter, a control method of an electronic apparatus depending on an occurring event will be described in more detail with reference to FIGS. 6 to 8.

Figure 6:
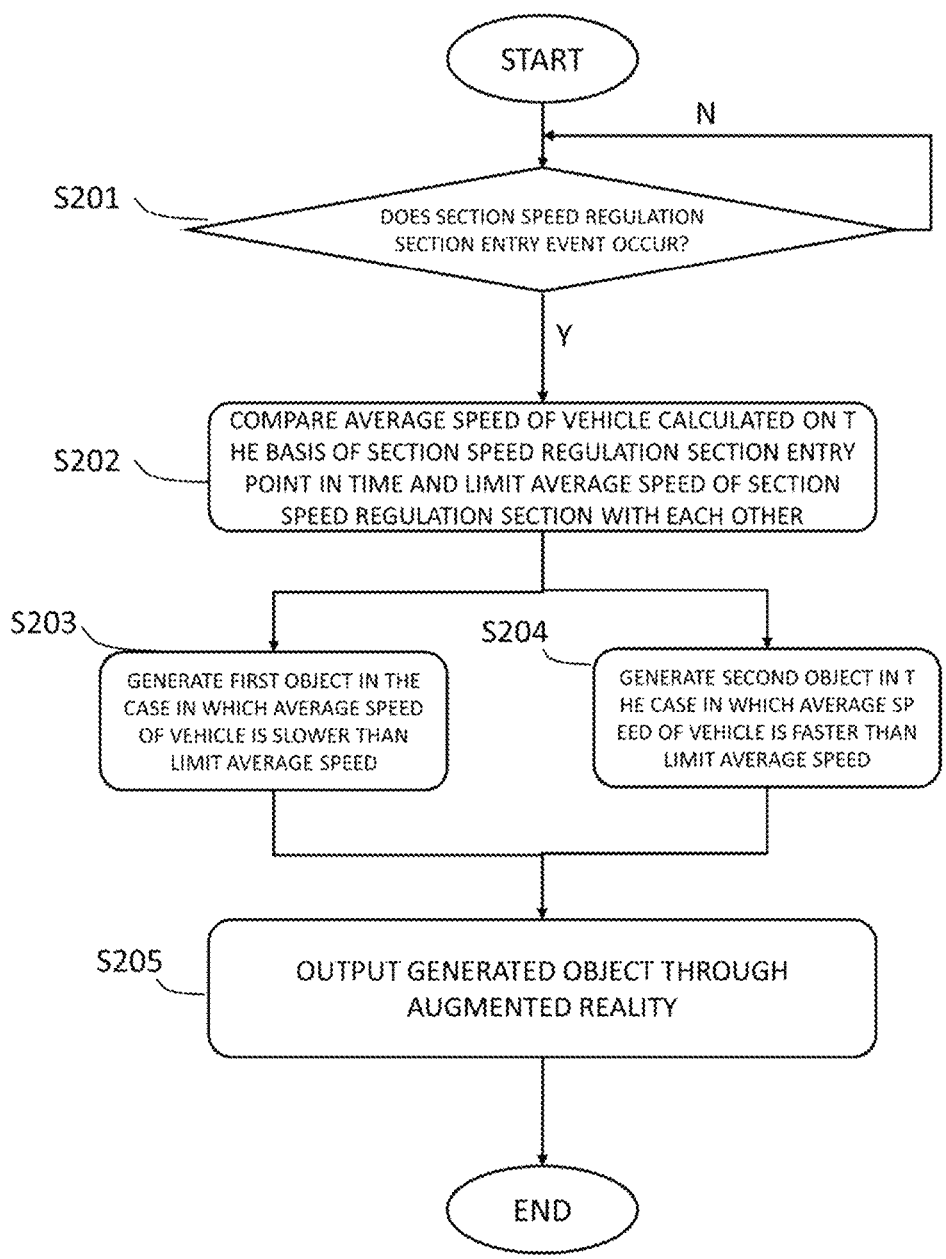
FIG. 6 is a flow chart illustrating a control method of an electronic apparatus at the time of occurrence of a section speed regulation section entry event according to an exemplary embodiment of the present invention.

FIG. 6 is a flow chart illustrating a control method of an electronic apparatus at the time of occurrence of a section speed regulation section entry event according to an exemplary embodiment of the present invention. Referring to FIG. 6, the electronic apparatus 100 may determine whether or not the section speed regulation section entry event has occurred (S201).

When it is determine that the event has occurred, the electronic apparatus 100 may compare the average speed of the vehicle calculated on the basis of the section speed regulation section entry point in time and the limit average speed of the section speed regulation section with each other (S202).

Then, the electronic apparatus 100 may generate the first object in the case in which the average speed of the vehicle is slower than the limit average speed of the section speed regulation section (S203).

Alternatively, the electronic apparatus 100 may generate the second object in the case in which the average speed of the vehicle is faster than the limit average speed of the section speed regulation section (S204).

Then, the electronic apparatus 100 may output the generated object through the augmented reality (S205).

Here, the first object may be expressed far away from the vehicle on the augmented reality screen in order to allow the driver to recognize that the average speed of the vehicle is slower than the limit average speed of the section speed regulation section. In addition, the second object may be expressed at a lower end of the augmented reality screen corresponding to the position of the vehicle on the augmented reality screen in order to allow the driver to recognize that the average speed of the vehicle is faster than the limit average speed of the section speed regulation section.

Figure 7:
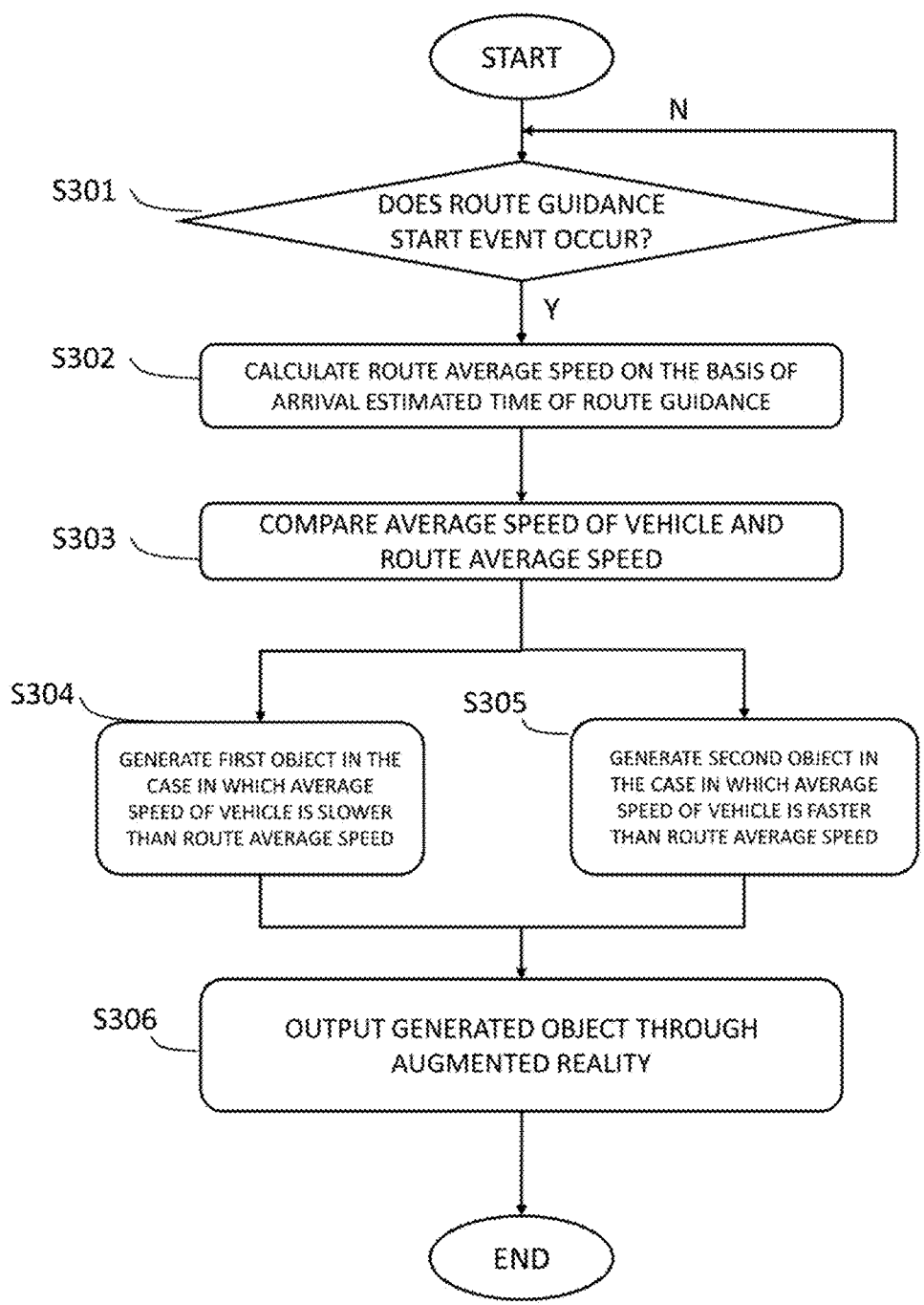
FIG. 7 is a flow chart illustrating a control method of an electronic apparatus at the time of occurrence of a route guidance start event up to a destination according to an exemplary embodiment of the present invention.

FIG. 7 is a flow chart illustrating a control method of an electronic apparatus at the time of occurrence of a route guidance start event up to a destination according to an exemplary embodiment of the present invention. Referring to FIG. 7, the electronic apparatus 100 may determine e whether or not the route guidance start event has occurred (S301).

When it is determine that the event has occurred, the electronic apparatus 100 may calculate the route average speed on the basis of the arrival estimated time calculated by reflecting the real time traffic information of the route guidance start point in time (S302). Here, the real time traffic information may include the RTM, the CTT, and the like, received through the TPEG, or the like.

Then, the electronic apparatus 100 may compare the average speed of the vehicle and the route average speed (S303).

Then, the electronic apparatus 100 may generate the first object in the case in which the average speed of the vehicle is slower than the route average speed (S304).

Alternatively, the electronic apparatus 100 may generate the second object in the case in which the average speed of the vehicle is faster than the route average speed (S305).

Then, the electronic apparatus 100 may output the generated object through the augmented reality (S306). Here, the first object may be expressed far away from the vehicle on the augmented reality screen in order to allow the driver to recognize that the average speed of the vehicle is slower than the route average speed. In addition, the second object may be expressed at a lower end of the augmented reality screen corresponding to the position of the vehicle on the augmented reality screen in order to allow the driver to recognize that the average speed of the vehicle is faster than the route average speed.

Figure 8:
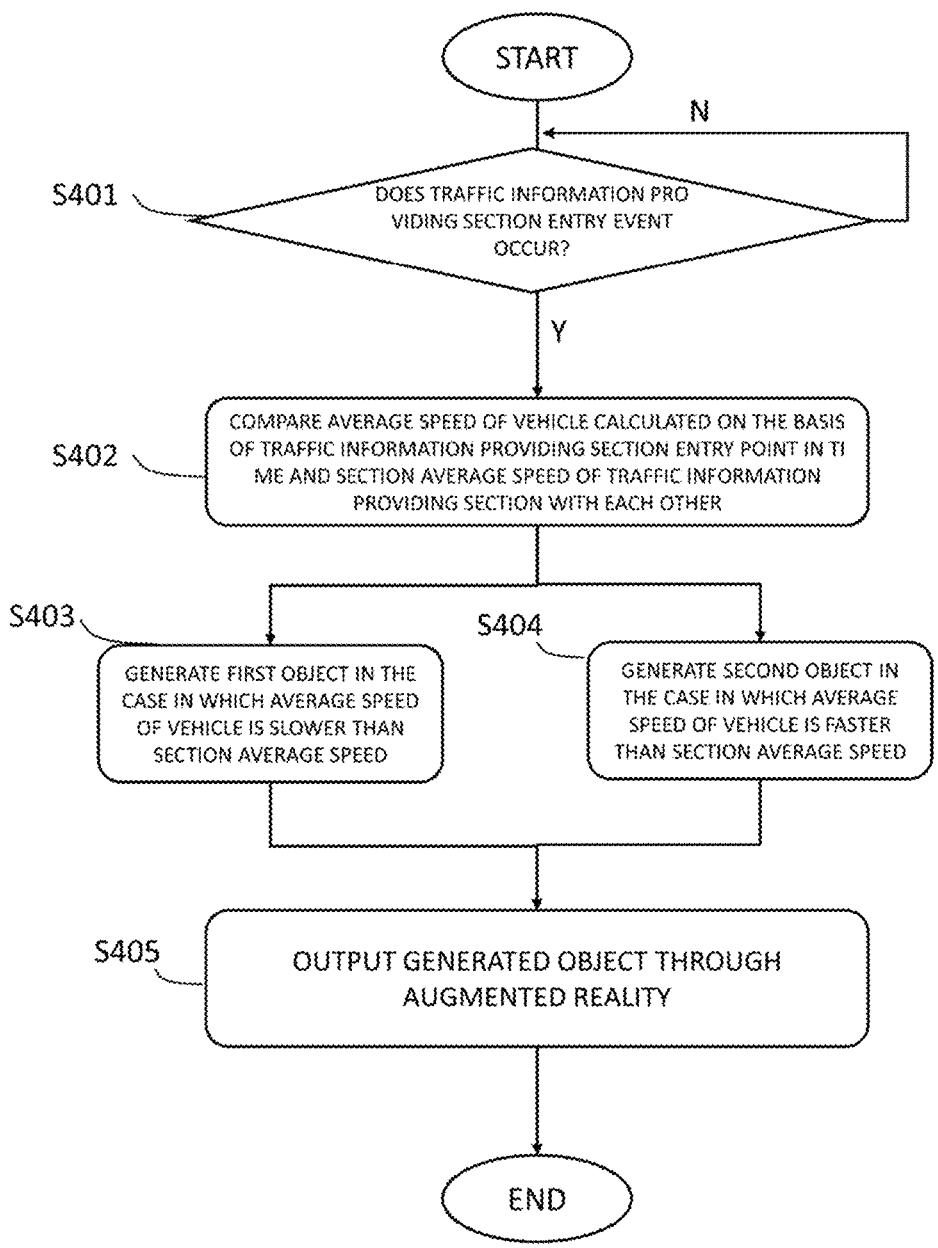
FIG. 8 is a flow chart illustrating a control method of an electronic apparatus at the time of occurrence of a traffic information providing section entry event according to an exemplary embodiment of the present invention.

FIG. 8 is a flow chart illustrating a control method of an electronic apparatus at the time of occurrence of a traffic information providing section entry event according to an exemplary embodiment of the present invention. Referring to FIG. 8, the electronic apparatus 100 may determine whether or not the traffic information providing section entry event has occurred (S401).

When it is determined that the event has occurred, the electronic apparatus 100 may compare the average speed of the vehicle calculated on the basis of the traffic information providing section entry point in time and the section average speed of the traffic information providing section with each other (S402). Here, the section average speed of the traffic information providing section may be calculated on the basis of the RTM, or the like, received through the TPEG, or the like.

Then, the electronic apparatus 100 may generate the first object in the case in which the average speed of the vehicle is slower than the section average speed of the traffic information providing section (S403).

Alternatively, the electronic apparatus 100 may generate the second object in the case in which the average speed of the vehicle is faster than the section average speed of the traffic information providing section (S404).

Then, the electronic apparatus 100 may output the generated object through the augmented reality (S405). Here, the first object may be expressed far away from the vehicle on the augmented reality screen in order to allow the driver to recognize that the average speed of the vehicle is slower than the section average speed. In addition, the second object may be expressed at the lowermost end of the augmented reality screen corresponding to the position of the vehicle on the augmented reality screen in order to allow the driver to recognize that the average speed of the vehicle is faster than the section average speed.

Hereinafter, an augmented reality screen expressing method of an electronic apparatus in the case in the section speed regulation section entry event occurs will be described in detail with reference to FIGS. 9A to 10.

Figure 9A:
FIGS. 9A to 9C are views illustrating augmented reality screens according to an exemplary embodiment of the present invention.
Figure 9B:
Figure 9C:

FIGS. 9A to 9C are views illustrating augmented reality screens according to an exemplary embodiment of the present invention. Referring to FIG. 9A, in the case in which an average speed ② of the vehicle, which is 91 km/h, is faster than a limit average speed ① of a section speed regulation section, which is 90 km/h, a second object ③ may be expressed at the lowermost end of an augmented reality screen corresponding to a position of the vehicle on the augmented reality screen. In addition, an arrow included in the second object ③ may be expressed in an opposite direction to a movement direction of the vehicle. Further, a color of the second object ③ may be implemented as a color for allowing the driver to recognize that the vehicle is in a violation state, for example, a red color. Therefore, the driver may easily recognize that the vehicle currently violates section speed regulation, and decelerate the vehicle.

Referring to FIGS. 9B and 9C, in the case in which an average speed ② of the vehicle, which is 84 km/h, is slower than a limit average speed ① of a section speed regulation section, which is 90 km/h, a first object ③ may be expressed far away from the vehicle on the augmented reality screen. In addition, a color of the first object ③ may be implemented as a color for allowing the driver to recognize that the vehicle is not in a violation state, for example, a green color.

Meanwhile, an expression position of the first object ③ may be fluidly changed depending on a difference between the average speed ② of the vehicle and the limit average speed ① of the section speed regulation section. For example, when the difference between the average speed ② of the vehicle and the limit average speed ① is increased from 6 km/h as illustrated in FIG. 9B to 26 km/h as illustrated in FIG. 9C, the first object ③ may be expressed farther and farther away the vehicle on the augmented reality screen. Therefore, the driver may easily recognize that the average speed is currently slower than the limit average speed of the section speed regulation section, and accelerate the vehicle.

Figure 10A:
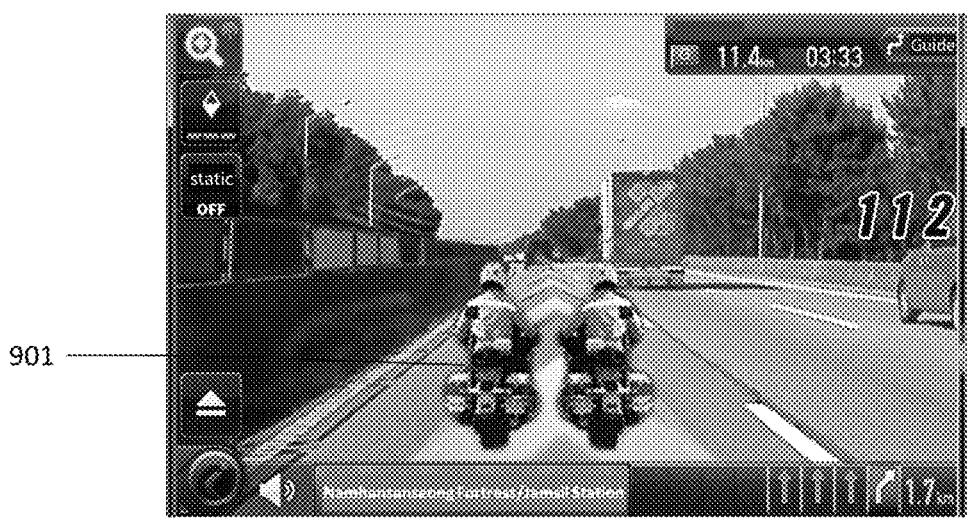
FIGS. 10A to 10C are views illustrating augmented reality screens according to another exemplary embodiment of the present invention.
Figure 10B:
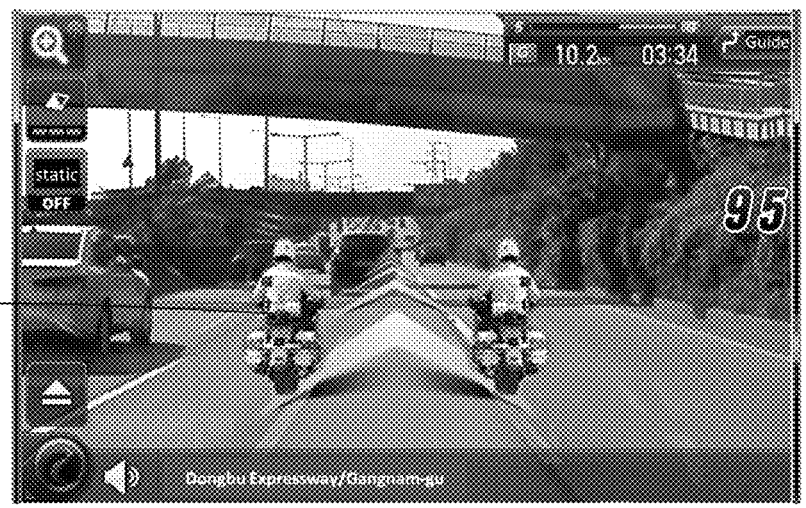
Figure 10C:

FIGS. 10A to 10C are views illustrating augmented reality screens according to another exemplary embodiment of the present invention. Referring to FIGS. 10A to 10C, first and second objects may be implemented in a shape of a policeman. As an example, in the case in which an average speed of the vehicle is faster than a limit average speed of a section speed regulation section, the second object 901 may be expressed adjacently to the vehicle on the augmented reality screen, as illustrated in FIG. 10A. However, in the case in which the average speed of the vehicle is slower than the limit average speed of the section speed regulation speed, the first object 902 or 903 may be expressed far away from the vehicle on the augmented reality screen, as illustrated in FIGS. 10B and 10C.

Figure 11:
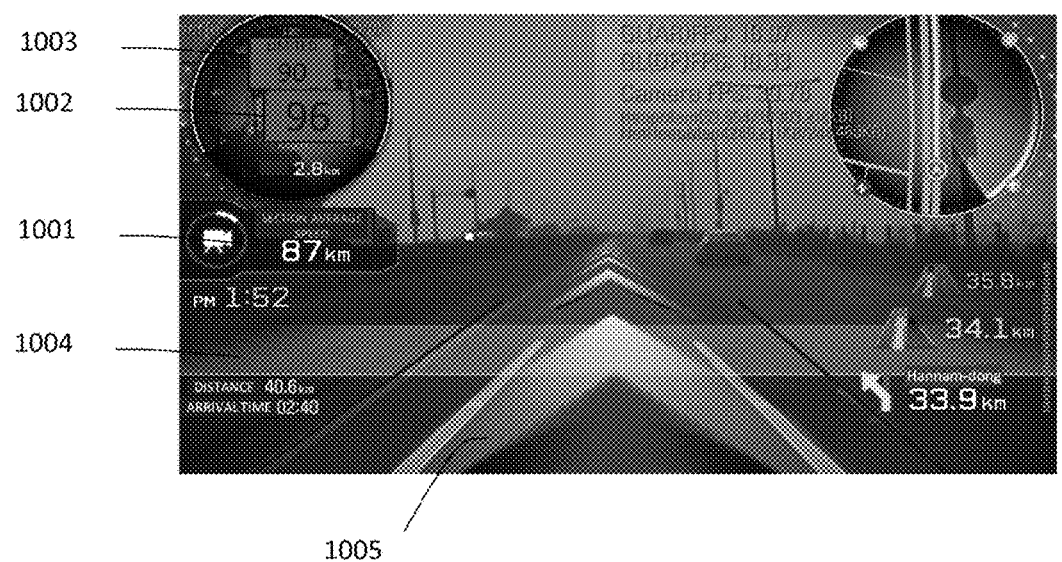
FIG. 11 is a view illustrating an augmented reality screen according to still another exemplary embodiment of the present invention.

FIG. 11 is a view illustrating an augmented reality screen according to still another exemplary embodiment of the present invention. Referring to FIG. 11, in the case in which an average speed 1001 of the vehicle is slower than a limit average speed 1003 of a section speed regulation speed, a first object 1004 may be expressed far away from the vehicle on the augmented reality screen, and a color of the first object 1004 may be implemented as a green color in order to allow the driver to recognize that the vehicle does not currently violate section speed regulation.

However, in the case of FIG. 11, since a real time speed 1002 of the vehicle is faster than the limit average speed 1003 of the section speed regulation speed, a route guidance line 1005 may be expressed by a red color in order to allow the driver to recognize that the real time speed currently exceeds the limit average speed.

Figure 12:
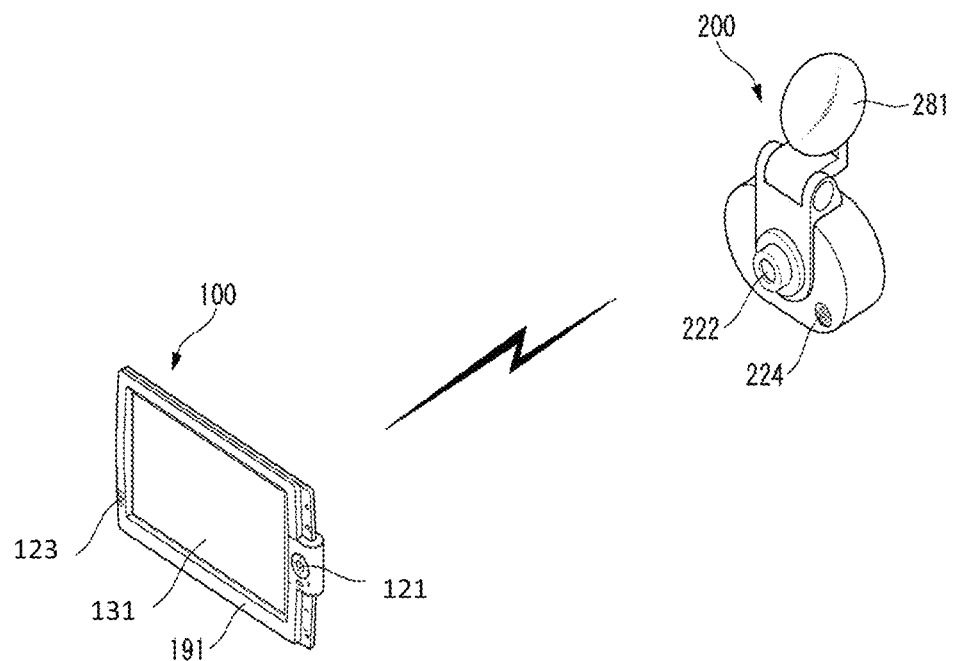
FIG. 12 is a view illustrating an implementation in the case in which a camera and an electronic apparatus according to an exemplary embodiment of the present invention are separated from each other.

FIG. 12 is a view illustrating an implementation in the case in which a navigation apparatus according to an exemplary embodiment of the present invention does not include a photographing unit. Referring to FIG. 12, a navigation apparatus 100 for a vehicle and a separately provided black box 200 for a vehicle may configure a system according to an exemplary embodiment of the present invention using a wired/wireless communication scheme.

The navigation apparatus 100 for a vehicle may include a display unit 131 provided on a front surface of a navigation housing 191, a navigation manipulation key 121, and a navigation microphone 123.

The black box 200 for a vehicle may include a black box camera 222, a black box microphone 224, and an attaching part 281.

Figure 13:
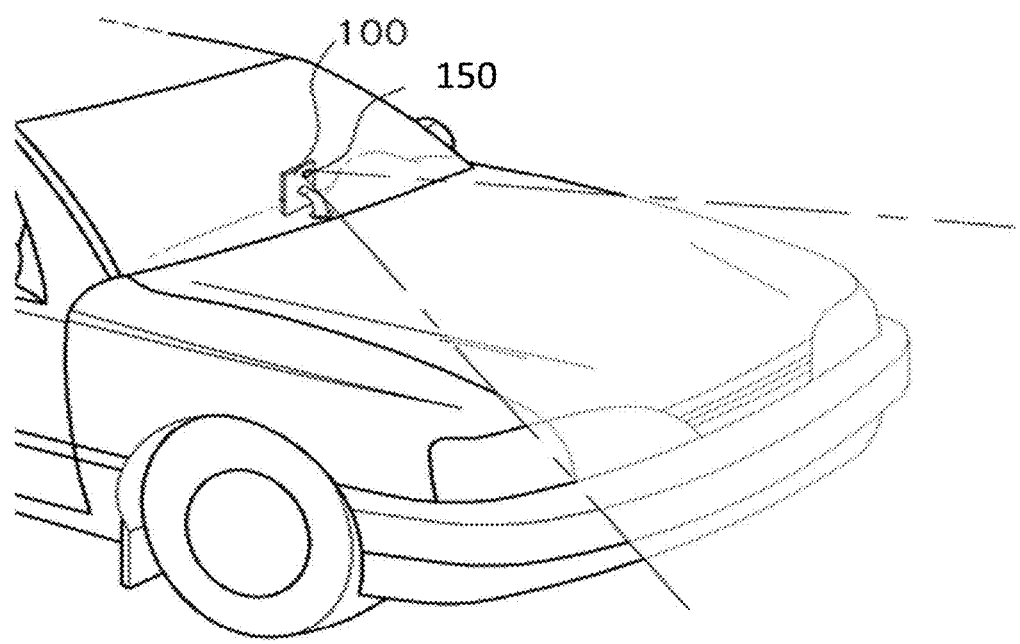
FIG. 13 is a view illustrating an implementation in the case in which a camera and an electronic apparatus according to an exemplary embodiment of the present invention are integrated with each other.

FIG. 13 is a view illustrating an implementation in the case in which a navigation apparatus according to an exemplary embodiment of the present invention includes a photographing unit. Referring to FIG. 13, in the case in which the navigation apparatus 100 includes the photographing unit 150, the user may mount the navigation apparatus 100 so that the photographing unit 150 of the navigation apparatus 100 photographs the front of the vehicle and the display unit of the navigation apparatus 100 may be recognized by the user. Therefore, a system according to an exemplary embodiment of the present invention may be implemented.

Figure 14:
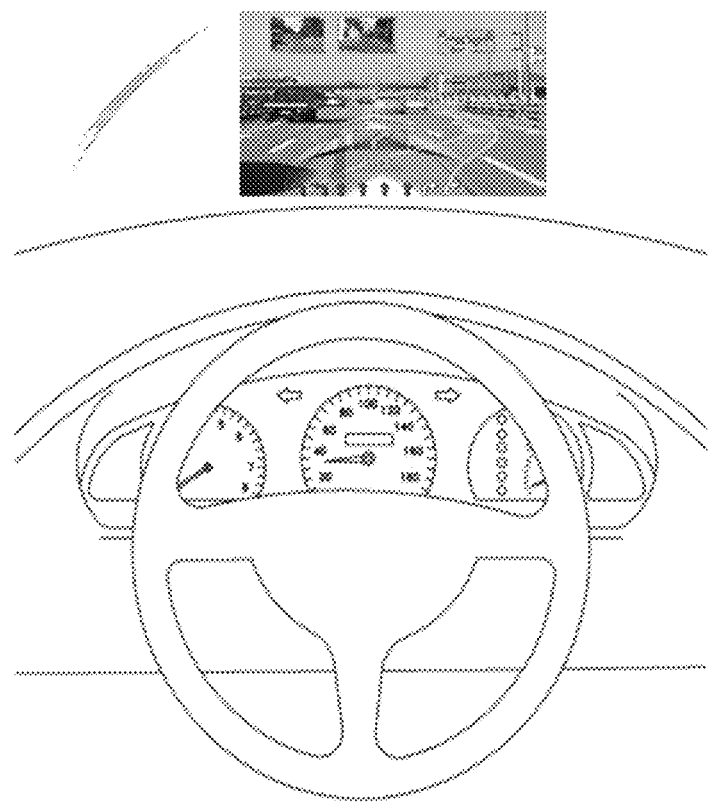
FIG. 14 is a view illustrating an implementation using a head-up display (HUD) and an electronic apparatus according to an exemplary embodiment of the present invention.

FIG. 14 is a view illustrating an implementation using a head-up display (HUD) according to an exemplary embodiment of the present invention. Referring to FIG. 14, the HUD may display an augmented reality guidance screen thereon through wired/wireless communication with other devices.

As an example, the augmented reality may be provided through the HUD using a front glass of the vehicle, an image overlay using a separate image output apparatus, or the like, and the augmented reality providing unit 160 may generate an interface image overlaid on the augmented reality image or the glass as described above, or the like. Through this, an augmented reality navigation apparatus, a vehicle infotainment system, or the like, may be implemented.

According to various exemplary embodiments of the present invention described above, guidance information is dynamically expressed by an augmented reality method in a section in which a section speed regulation camera is present, a section in which real time traffic information is provided, a route guidance section to a destination, and the like, thereby making it possible to provide effective guidance to the driver, cause an interest of the driver, and promote safety driving and convenience of the driver for the vehicle.

In addition, according to various exemplary embodiments of the present invention described above, the expression position of the object on the augmented reality (AR) is fluidly changed depending on a speed of the vehicle, thereby making it possible to perform guidance on the driver by a more intuitive method.

Meanwhile, the control methods according to various exemplary embodiments of the present invention described above may be implemented as programs and be provided to servers or devices. Therefore, the respective apparatuses may access the servers or the devices in which the programs are stored to download the programs.

In addition, the control method according to various exemplary embodiments of the present invention described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by a device. In detail, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A control method of an electronic apparatus, comprising:
    determining whether a specific event occurs;
    calculating an average speed of a vehicle if the specific event occurs;
    when the average speed of the vehicle is slower than an event speed of the specific event, generating a first object and when the average speed of the vehicle is faster than the event speed of the specific event, generating a second object, wherein each of the first object and the second object indicates a relationship between the average speed and the event speed;
    mapping the first object and the second object onto a road region of an augmented reality image; and
    displaying at least one of the first object and the second object through the augmented reality image in accordance with a speed difference between the average speed of the vehicle and the event speed, wherein the first object and the second object have different size and location on the augmented reality image,
    wherein a mapping position of the first object on the road region fluidly changes according to the speed difference between the average speed of the vehicle and the event speed,
    wherein a mapping position of the second object on the road region does not fluidly change regardless of the speed difference between the average speed of the vehicle and the event speed, and the second object is displayed at a lower of the road region of the augmented reality image, and
    wherein the mapping position of the first object is located higher than the mapping position of the second object on the road region.

2. The control method of an electronic apparatus of claim 1, wherein the specific event includes at least one of a section speed regulation section entry event, a route guidance start event up to a destination, and a traffic information providing section entry event.

3. The control method of an electronic apparatus of claim 2, wherein in the case of the section speed regulation section entry event, the generating includes:
    comparing the average speed of the vehicle calculated on the basis of a section speed regulation section entry point in time and a limit average speed of a section speed regulation section with each other; and
    generating the first object indicating a relationship between the average speed of the vehicle and the limit average speed depending on a comparison result.

4. The control method of an electronic apparatus of claim 2, wherein in the case of the route guidance start event up to the destination, the generating includes:
    calculating a route average speed on the basis of an arrival estimated time calculated by reflecting real time traffic information of a route guidance start point in time;
    comparing the average speed of the vehicle and the route average speed; and
    generating the first object indicating a relationship between the average speed of the vehicle and the route average speed depending on a comparison result.

5. The control method of an electronic apparatus of claim 2, wherein in the case of the traffic information providing section entry event, the generating includes:
    comparing an average speed of the vehicle calculated on the basis of a traffic information providing section entry point in time and a section average speed of the traffic information providing section with each other; and
    generating the first object indicating a relationship between the average speed of the vehicle and the section average speed depending on a comparison result.

6. The control method of an electronic apparatus of claim 1, wherein the augmented reality image is implemented to have a virtual three-dimensional (3D) space using a photographed image of a camera by
    performing calibration on the camera to calculate camera parameters;
    generating the virtual 3D space for the photographed image of the camera on the basis of the camera parameters; and
    positioning the generated object on the virtual 3D space.

7. The control method of an electronic apparatus of claim 6, wherein in the positioning, the first and second objects are controlled to be positioned and expressed at a lower end of a vanishing point of the photographed image of the camera.

8. The control method of an electronic apparatus of claim 7, wherein a distance between the first object and the vanishing point is shorter than a distance between the second object and the vanishing point.

9. The control method of an electronic apparatus of claim 7, wherein the first and second objects are distinguished from each other by different colors and each color of the first and second objects informs a driver whether a traffic law is violated or not based on the speed difference the average speed of the vehicle and the event speed.

10. The control method of the electronic apparatus of claim 1, wherein the first object and the second object are displayed in parallel to the road region.

11. The control method of the electronic apparatus of claim 1, wherein an arrow included in the second object is displayed in an opposite direction to a movement direction of the vehicle.

12. An electronic apparatus, including at least one processor, comprising:
a display displaying a screen;
an average speed calculator calculating an average speed of a vehicle when the specific event occurs;
a generator, when the average speed of the vehicle is slower than an event speed of the specific event, generating a first object and, when the average speed of the vehicle is faster than the event speed of the specific event, generating a second object, wherein each of the first object and the second object indicates a relationship between the calculated average speed and the event speed; and
a controller mapping the first object and the second object onto a road region of an augmented reality image; and
displaying at least one of the first object and the second object through an augmented reality image in accordance with a speed difference between the average speed of the vehicle and the event speed, wherein the first object and the second object have different size and location on the augmented reality image,
wherein a mapping position of the first object on the road region fluidly changes according to the speed difference between the average speed of the vehicle and the event speed,
wherein a mapping position of the second object on the road region does not fluidly change regardless of the speed difference between the average speed of the vehicle and the event speed, and the second object is displayed at a lower of the road region of the augmented reality image, and
wherein the mapping position of the first object is located higher than the mapping position of the second object on the road region.

13. The electronic apparatus of claim 12, wherein the specific event includes at least one of a section speed regulation section entry event, a route guidance start event up to a destination, and a traffic information providing section entry event.

14. The electronic apparatus of claim 13, wherein in the case of the section speed regulation section entry event, the controller compares an average speed of the vehicle calculated on the basis of a section speed regulation section entry point in time and a limit average speed of a section speed regulation section with each other, and
the generator generates the first object indicating a relationship between the average speed of the vehicle and the limit average speed depending on a comparison result.

15. The electronic apparatus of claim 13, wherein in the case of the route guidance start event up to the destination, the controller calculates a route average speed on the basis of an arrival estimated time calculated by reflecting real time traffic information of a route guidance start point in time and compares the average speed of the vehicle and the route average speed, and
the generator generates the first object indicating a relationship between the average speed of the vehicle and the route average speed depending on a comparison result.

16. The electronic apparatus of claim 13, wherein in the case of the traffic information providing section entry event, the controller compares an average speed of the vehicle calculated on the basis of a traffic information providing section entry point in time and a section average speed of the traffic information providing section with each other, and
the generator generates the first object indicating a relationship between the average speed of the vehicle and the section average speed depending on a comparison result.

17. The electronic apparatus of claim 12, wherein the controller performs calibration on a camera to calculate camera parameters, generates a virtual 3D space for photographed image of the camera on the basis of the camera parameters, and positions the generated object on the virtual 3D space of the augmented reality image.

18. The electronic apparatus of claim 12, wherein the first object and the second object are displayed in parallel to the road region.

19. A non-transitory computer readable storage medium containing instructions, that when executed by one or more processors, cause the one or more processors to perform a method, the method comprising:
determining whether a specific event occurs;
calculating an average speed of a vehicle if the specific event occurs;
when the average speed of the vehicle is slower than an event speed of the specific event, generating a first object and when the average speed of the vehicle is faster than the event speed of the specific event, generating a second object, wherein each of the first object and the second object indicates a relationship between the calculated average speed and the event speed;
mapping the first object and the second object onto a road region of an augmented reality image; and
displaying at least one of the first object and the second object through the augmented reality image in accordance with a speed difference between the average speed of the vehicle and the event speed, wherein the first object and the second object have different size and location on the augmented reality image,
wherein a mapping position of the first object on the road region fluidly changes according to the speed difference between the average speed of the vehicle and the event speed,
wherein a mapping position of the second object on the road region does not fluidly change regardless of the speed difference between the average speed of the vehicle and the event speed, and the second object is displayed at a lower of the road region of the augmented reality image, and
wherein the mapping position of the first object is located higher than the mapping position of the second object on the road region.

20. The non-transitory computer readable storage medium of claim 19, wherein the first object and the second object are displayed in parallel to the road region.

* * * * *